Patented Apr. 2, 1935

1,996,570

UNITED STATES PATENT OFFICE 1,996,570

LACQUER

Oscar A. Cherry, Chicago, Ill., assignor to Economy Fuse and Manufacturing Company, Chicago, Ill., a corporation of New York No Drawing. Application September 8, 1932, Serial No. 632,189

3 Claims. (Cl. 134—26)

This invention relates to a new and improved lacquer and to the process of preparing same.

It is an object of this invention to prepare a novel lacquer mixture of the cellulose ester type characterized by including a synthetic resin which is more perfectly compatible with the cellulose ester than the various other resins heretofore employed.

Other objects not specifically enumerated are contemplated for this invention as will readily appear to one skilled in the art as the following description proceeds.

In considering the resin utilized in this invention it may be mentioned that it is well known to prepare synthetic resins of the ester type by the reaction of polybasic acids and polyhydric alcohols, which resins have considerable commercial importance but in certain instances have been modified in order to obtain certain properties of solubility and/or flexibility.

The usual method of modification consists in forming a mixed ester of polybasic and monobasic acids and polyhydric alcohol. The monobasic acids usually chosen are abietic anhydride (rosin) or the fatty acids derived from vegetable oils. For example, mixed glycerides of phthalic anhydride and rosin form an important synthetic resin. It is also known to modify the solubility behavior of phenol aldehyde resins by heating the phenol resins with rosin to presumably esterify the phenolic hydroxyl group and thereafter to esterify the excess of rosin with glycerol. These two types of resins have certain advantages. The ester type, namely the phthalic anhydride-rosin-glycerol complexes are somewhat tougher than the modified phenol resin type, but for certain light colored varnishes, the phenol resins are to be preferred.

However, resins of the above described type are not altogether suitable as the resin constituent is a cellulose ester lacquer, particularly lacquers composed of cellulose acetate. Both are compatible to some extent, with cellulose nitrate used in lacquers, the ester type being better suited in a large number of cases.

In applicant's co-pending application, Serial Number 631,888, filed Sept. 6, 1932, there is described and claimed a novel resin possessing valuable properties of both of the above types of resins and in addition, possessing properties heretofore unobtainable in either. This novel resin is prepared by forming a mixed glyceride of a polybasic acid and a resin acid, wherein the polybasic acid possesses structural and solubility relationships to a phenol resin. The polybasic acid best suited for this purpose is dihydroxyldiphenylmethane dicarboxylic acid. This acid is easily obtained by the condensation of salicylic acid with formaldehyde.

The lacquer of this invention is novel in that it includes the resin above referred to, described and claimed in said co-pending application and therefore possesses improved properties by virtue of the properties of the resin, some of which have been unobtainable heretofore.

By way of example, lacquers embodying the new and improved resins referred to may be prepared in accordance with the following typical formulas. As is well known in this art, various changes can be made in the formulas without departing from the spirit of the invention.

For the purpose of convenience in describing and claiming this invention, reference will be made to a "synthetic resin" and by the term "synthetic resin" is meant a resin produced by the interaction of a hydroxy dibasic acid of the diphenylmethane series, a monobasic carboxylic acid and a polyhydric alcohol in accordance with the teachings of applicant's copending application and in which the monobasic acid constituent may consist of a mixture of natural resin acids or a mixture of natural resin acid and a satisfactory acid derived from a drying oil.

The typical formulas are as follows, all parts being given by weight:

| | Parts |
|---|---|
| ½ sec. soluble cotton, containing 15% by weight of alcohol | 20.2 |
| Ethyl acetate | 45 |
| Butyl acetate | 27 |
| Castor oil | 5 |
| Toluol | 90 |
| V. M. & P. naphtha | 18 |
| Synthetic resin | 31.5 |

| | |
|---|---|
| Acetone soluble cellulose acetate | 15 |
| Ethylene dichloride | 205 |
| Denatured alcohol, formula #5 | 32 |
| Diacetone alcohol | 10 |
| Synthetic resin | 15 |

I claim:

1. A cellulose ester lacquer comprising the following ingredients in substantially the proportions specified:

| | Parts |
|---|---|
| ½ sec. soluble cotton, containing 15% by weight of alcohol | 20.2 |
| Ethyl acetate | 45 |
| Butyl acetate | 27 |
| Castor oil | 5 |
| Toluol | 90 |
| V. M. & P. Naphtha | 18 |
| Synthetic resin | 31.5 |

2. A cellulose ester lacquer comprising the following ingredients in substantially the proportions specified:

| | Parts |
|---|---|
| Acetone soluble cellulose acetate | 15 |
| Ethylene dichloride | 205 |
| Denatured alcohol, formula #5 | 32 |
| Diacetone alcohol | 10 |
| Synthetic resin | 15 |

3. A lacquer comprising a cellulose ester of the class including cellulose nitrate and cellulose acetate, and a synthetic resin compatible therewith which comprises a mixed glyceride of a dihydroxydiphenylmethane dicarboxylic acid and a monobasic carboxylic acid.

OSCAR A. CHERRY.